Jan. 2, 1923.
C. CUTLER.
LAWN MOWER EXTENSION HANDLE.
FILED OCT. 3, 1921
1,441,144.
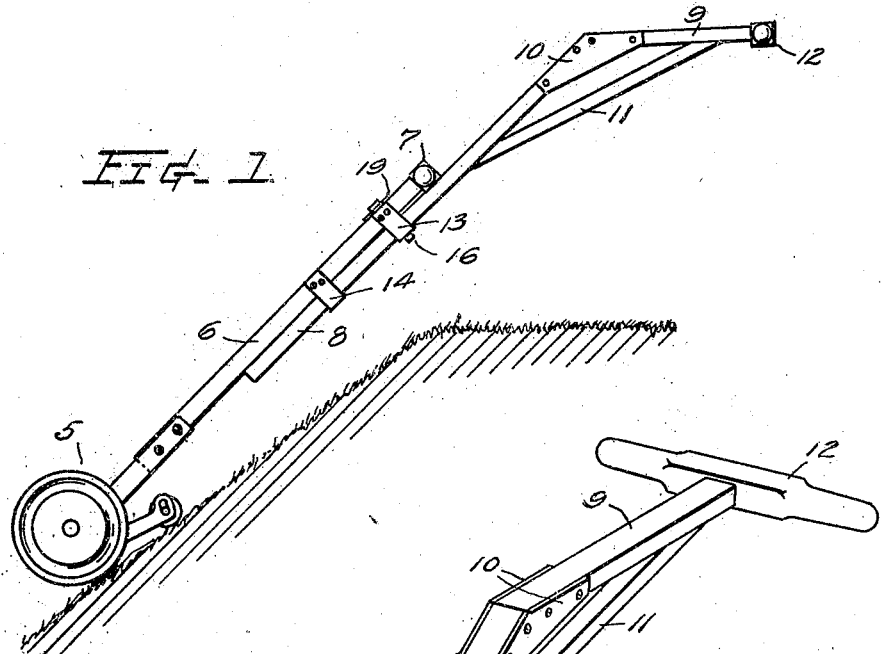
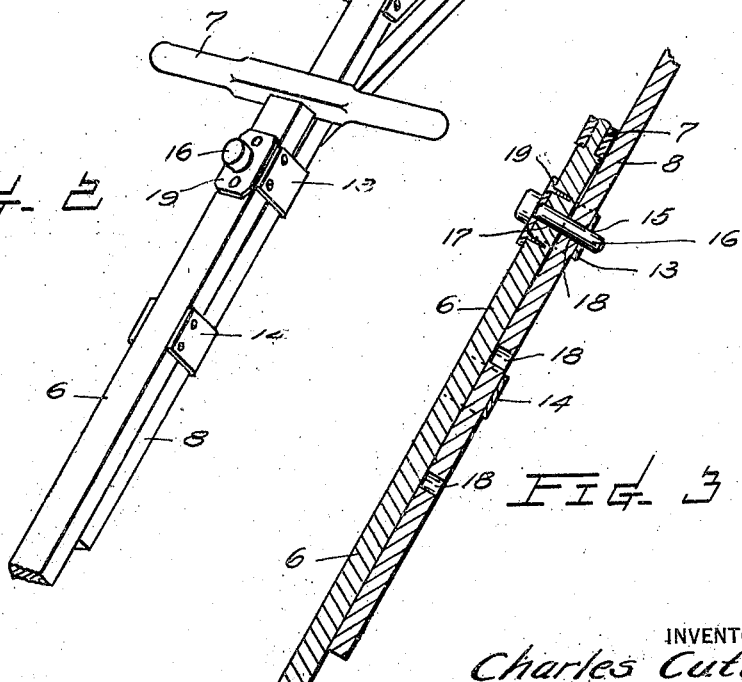
INVENTOR:
Charles Cutler
BY
Pierre Barnes
ATTORNEY Patented Jan. 2, 1923.

1,441,144

UNITED STATES PATENT OFFICE.

CHARLES CUTLER, OF SEATTLE, WASHINGTON.

LAWN-MOWER EXTENSION HANDLE.

Application filed October 3, 1921. Serial No. 505,169.

*To all whom it may concern:*

Be it known that I, CHARLES CUTLER, a citizen of the United States, residing in Seattle, in the county of King and State of Washington, have invented a new and useful Lawn-Mower Extension Handle, of which the following is a specification.

This invention relates to lawn mower handles and, more especially, to detachable extensions for operating a mower on a terrace.

The object of my invention is the provision of an inexpensively constructed attachment of this character which is convenient and efficient in use.

The invention consists in the novel construction, arrangement and combination of parts hereinafter described and claimed.

In the accompanying drawings,—

Figure 1 is a side elevational view of a lawn mower provided with a supplementary handle embodying my invention. Fig. 2 is a perspective view of the handle device illustrated in Fig. 1. Fig. 3 is a central longitudinal section of portions of the handle members shown in the preceding views to illustrate the connection between the members.

In said drawings, the reference numeral 5 designates a lawn mower of known construction and having a handle 6 provided with a handle bar 7.

According to the present invention I provide a supplementary handle formed of a lower portion 8 and an upper portion 9 disposed in angular relations of approximately fifty-five degrees with respect to each other. As illustrated the portions 8 and 9 of the supplementary handle are rigidly connected together by means of gusset plates 10 secured by screws to the opposite sides of the handle parts in proximity with the joint between the same, and by means of a strut 11, as shown in Figs. 1 and 2. 12 represents a handle bar secured to the end of the handle part 9.

Secured to and extending from the under side of the handle 6 in spaced relations with each other are stirrups 13 and 14 to receive the part 8 of the supplementary handle.

The stirrup 13 is provided with an aperture 15 to accommodate a locking pin 16 which extends through an aligned hole 17 in the main handle 6 and a selected one of a series of spaced holes 18 provided in the part 8 of said supplementary handle.

19 represents an apertured reinforcing plate which may be advantageously secured to the upper side of the main handle 6 to afford additional bearing surface for the locking pin and to compensate for the weakening of the handle due to the hole 17.

The supplementary handle is designed for use only upon sloping surfaces and may be quickly disconnected by being withdrawn from the stirrups after removing the locking pin 16. The supplementary handle is rigidly coupled by means of the stirrups to the main handle and may be held in adjusted relations therewith to accommodate different heights of terraces.

What I claim as my invention is,—

1. The combination with a lawn mower handle provided with an aperture therein, of an extension handle formed with two portions disposed in angular relations with each other, one of said portions being provided with a series of spaced apertures, a plurality of stirrups rigidly secured to said handle and arranged to receive the handle extension, and a locking pin engageable in the aperture of said handle and a selected one of the apertures of the handle extension for removably securing the latter to said handle.

2. The combination with a lawn mower handle, of a rigid extension therefor, said extension comprising two members disposed in angular relations with each other and a handle-bar at the outer end of one of said members, stirrup elements depending from said handle to receive the extension member remote from the handle-bar, and means for removably securing said extension to said handle in adjusted relations longitudinally of the latter.

CHARLES CUTLER.